United States Patent Office 2,881,513
Patented Apr. 14, 1959

2,881,513

COMPOSITION FOR SINTERED BARIUM CATHODES

Harry Huber and Jean Freytag, Paris, France, assignors to Compagnie Generale de Telegraphie Sans Fil, a corporation of France No Drawing. Application June 14, 1955
Serial No. 515,526

Claims priority, application France June 17, 1954

6 Claims. (Cl. 29—182.5)

The invention relates to tablets constituting the emissive part of sintered barium cathodes. These tablets are generally obtained by agglomerating, compressing and sintering a mass of powdered materials containing the cation Ba and various metals.

The object of the invention is to provide a composition for sintered barium cathodes said composition presenting, over the composition of prior art, certain advantages which will be stated hereunder.

The composition according to the invention comprises: a barium composition, a reducer and a carrier, the reducer being a carbide capable of reducing said barium composition when the two bodies are in the solid state and the carrier being a refractory metal or a carbide.

According to a preferred embodiment the molecular proportion of the carrier is 50 to 97% of the composition.

The invention also provides a process of manufacture of tablets for sintered barium cathodes comprising the following operations:

a. The barium composition is mixed with the reducer and the carrier which are finely powdered.

b. The mixture is subjected to high pressure and is sintered at high temperature.

According to a preferred mode of carrying out the invention, the barium salt is basic barium tungstate

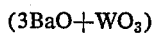
(3BaO+WO₃)

the reducer is tungsten carbide, the baking is carried out in a neutral atmosphere at a temperature between 2,400° F. and 3,272° F., and the duration of the sintering is between 3 hours and 5 minutes.

The invention will be more clearly understood from the ensuing examples to which the scope of the invention is not intended to be limited.

*Example 1*

An intimate mixture is obtained of barium carbonate BaCO₃ and tungsten oxide WO₃, both having been powdered for several hours, the proportions being 3 molecules of BaCO₃ to 1 molecule of WO₃. This mixture is sintered in a crucible in a furnace having a neutral atmosphere, such as argon, during between half an hour and one hour at a temperature between 430 and 1230° C. After sintering, the mixture is powdered by ball mill for a period varying from several hours to 30 hours. According to the duration of powdering the resultant size of the grains varies from 30 to 1 micron. Double oxide (3BaO+WO₃) obtained by the above-indicated operations is mixed with tungsten carbide and metallic tungsten in the proportion of 5 oxide molecules with 15 molecules of tungsten carbide and 80 atoms of tungsten, i.e., in fact, 80 molecules of tungsten since the molecules of metals are monatomic, this mixture being ground for several hours, the size of the resultant grains being between 1 and 50 microns. A certain amount of this mixture is compressed by means of a press capable of exerting a pressure between 1 and 30 metric tons/cm.² The tablet obtained is positioned on a support, or in a container permitting its attachment to a support, and it is sintered in an argon atmosphere at a temperature between 2,400° F. and 3,272° F. for a period varying from 3 hours to 5 minutes. The surface of the sintered tablet is ground.

The tablet obtained possesses the following advantages:

(1) High mechanical resistance to tearing, rupture or shearing.

(2) Low susceptibility to ionic bombardment and poisoning by gases and vapors.

(3) Possibility of supplying current at high density under conditions of both continuous and pulse operations.

(4) Smooth surface and good geometric definition of the emissive zone.

(5) Good thermal efficiency.

(6) Solidity and strength as concerns mechanical stresses and heat changes.

(7) Long life without metallization of the electrodes disposed in front of the cathode.

(8) Minimum emission of gas during the degasing of the cathode and during its activation.

(9) Ease of machining.

(10) Easier determination of the required intensity of liberation and diffusion of the film of barium to suit the particular application of the cathode.

Cathodes utilizing this tablet are capable of operating between 730° and 1,270° C., and of emitting several amperes per sq. cm. under continuous operation and several tens of amperes per sq. cm. under pulse operation.

Some of the above-mentioned advantages may be attributed to the formation of an active film of barium adsorbed on the surface of the tungsten carrier. This film of barium decreases the work function of the tungsten. As it is continuously subjected to destructive effect in the course of operation of the cathode, this film must be continuously renewed. This renewal is obtained by diffusion at high temperature of the barium liberated by the reducer (tungsten carbide), from the barium composition (3BaO+WO₃). The rate of liberation of the barium atoms depends in particular on the proportions and nature of the reducer. It has been found that, with the reducer used according to the invention, this rate may be correctly adjusted to obtain the desired density of emitted current.

The barium composition according to the invention generally comprises BaO and a stabilizing oxide (WO₃ in Example 1). This stabilizing oxide stabilizes chemically the oxide BaO which should be normally deteriorated in the presence of atmospheric air before sintering of the tablet.

*Example 2*

The same process of manufacturing the tablet as in Example 1 is employed with the following composition:

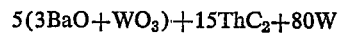
5(3BaO+WO₃)+15ThC₂+80W

*Example 3*

The same process of manufacture is employed with the following composition: 20(3BaO+WO₃)+80WC.

The tungsten carbide performs the function of reducer and carrier and the tungsten performs the function of the cation of the stabilizing oxide.

As all the bodies included in the formula mentioned above are very refractory, there is no danger of formation of vapors harmful to the cathode or to the other electrodes of the tube in which the latter is placed.

Example 4

Composition: $5(3BaO+WO_3)+15WC+80Mo$.

The reducer is tungsten carbide and molybdenum is the carrier.

Example 5

Composition: $20(BaO+WO_3)+80TaC$.

The tantalum carbide performs the function of both the reducer and the carrier.

Example 6

Composition: $20(BaO+CO_2)+80WC$.

The stabilizer is carbon dioxide, the carbide of the tungsten performing the functions of reducer and carrier.

Example 7

Composition: $5(BaO+WO_3)+15ThC_2+80Th$.

The thorium performs the functions of carrier and cation of the reducing oxide.

Example 8

Composition: $5(BaO+CO_2)+15WC+80W$.

The stabilizer is carbon dioxide, and the tungsten fulfills the functions of carrier and cation of the reducing oxide.

Example 9

Composition: $5(2BaO+Al_2O_3)+15ThC_2+80W$.

The above-mentioned carbides are not only very refractory and not only reducers. Most of them also have a high electrical conductivity. On the other hand, they have the property of strongly linking the adsorbed atoms, as is the case for instance for tungsten carbide which links to its surface atoms of thorium more strongly than tungsten.

The stabilizer is aluminum, the reducer is thorium carbide, and the carrier is tungsten.

Example 10

Composition: $5(BaO+CO_2)+15WC+80Mo$.

The stabilizer is carbon dioxide, the reducer is tungsten carbide and the carrier is molybdenum.

It must be understood that the scope of the invention is not intended to be limited to the above.

Experiments have been carried out using as the above-mentioned stabilizing oxide an oxide of one of the following metals: Al, W, Th, Ta, Nb, Mo, Ti, Zr.

There also may be used, for the stabilized BaO composition, a barium salt such as $BaCO_3$, though the barium compositions mentioned hereabove have given better results.

These compositions, comprising a barium oxide and a stabilizing metal oxide, may be obtained either from barium carbonate, as in the described examples, or from double carbonates such as $BaCO_3$—$SrCO_3$ or triple carbonates such as $BaCO_3$—$SrCO_3$—$CaCO_3$, by combining therewith a stabilizing oxide as described in the Example 1.

In certain cases the presence of another carbonate in addition to barium carbonate facilitates the stabilization of BaO or the formation of solid solutions permitting the stabilized compound to be enriched with BaO. According to the stabilizing oxides selected, there is obtained, furthermore, either basic double oxides of barium and of the stabilizing metal or solid solutions, the chemical relation being more or less intimate between BaO and the stabilizing oxide.

The cation of the reducing carbide may be selected from the group consisting of the metals Ti, Zr, Th, Ta, Nb, W, Mo, Al, Si, which are capable of reducing BaO at the temperature of operation of the cathode by a reaction in the solid state, BaO and this reducer being in the form of sintered powders.

The above-mentioned carbides are not only very refractory and not only reducers. Most of them also have a high electrical conductivity. On the other hand, they have the property of strongly linking the adsorbed atoms, as is the case for instance for tungsten carbide which links to its surface atoms of thorium more strongly than tungsten.

The carrier is a refractory metal such as W, Mo, Re, Nb, or a carbide thereof.

It has been seen in some of the foregoing examples that the same metal may perform some of the functions of stabilizer, reducer and carrier. It must of course possess all the properties required for the various functions it performs simultaneously; for example, W (Example 2) reduces BaO in the solid state and is sufficiently refractory for performing the function of carrier.

What we claim is:

1. Composition for tablet used as emissive portion of a sintered barium cathode, consisting essentially of:

| | Percent |
|---|---|
| Barium tungstate $3BaO+WO_3$ | 5 |
| Tungsten carbide WC | 15 |
| Tungsten W | 80 |

(in molar proportions)

2. Composition for tablet used as emissive portion for a sintered barium cathode, consisting essentially of:

| | Percent |
|---|---|
| Barium tungstate $3BaO+WO_3$ | 20 |
| Tungsten carbide WC | 80 |

(in molar proportions)

3. A process for the manufacture of a tablet used as emissive portion of a cathode, comprising the steps of intimately mixing a barium composition essentially consisting of a barium carbonate selected from the group of $BaCO_3$, double carbonate $BaCO_3$—$SrCO_3$, and triple carbonate $BaCO_3$—$SrCO_3$—$CaCO_3$ and of a stabilizing oxide selected from the group consisting of C, Al, W, Th, Ta, Nb, Mo, Ti and Zr, sintering said mixture in a neutral atmosphere between one half hour and one hour at a temperature between 430° C. and 1230° C., grinding said sintered composition to provide a grain size of 30 to 1 micron, mixing said ground sintered mixture with a metal carbide selected from the group consisting of Ti, Zr, Th, Ta, Nb, W, Mo, Al, and Si and with a refractory metal selected from the group consisting of W, Mo, Re, Nb and carbides thereof, to provide a resultant mixture with a grain size of between 1 and 50 microns, subjecting said resulting mixture to a pressure of between 1 and 30 metric tons/cm.², and thereupon sintering the compressed mixture in a neutral atmosphere at a temperature of between 2400° F. and 3272° F. for a period of three hours to five minutes.

4. An emissive cathode composition for a tablet used as an emissive portion of a heated sintered barium cathode, consisting of between 50% to 97% of a refractory metal selected from the group consisting of W, Mo, Re, Nb, and carbides of said metals, the balance comprising at least a chemically bound composition of barium oxide and of an oxide of an element selected from the group consisting of W, Th, Ta, Nb, Mo, Ti, Zr, Al, C for stabilizing said composition, said cathode composition containing a carbide of an element selected from the group of consisting of Ti, Zr, Th, Ta, Nb, W, Mo, Al, Si, for reducing the barium oxide at the temperature of operation of the cathode.

5. An emissive cathode composition as claimed in claim 4, wherein said chemically bound composition is basic barium tungstate $3BaO+WO_3$.

6. An emissive cathode composition as claimed in claim 4, wherein said chemically bound composition is a barium carbonate.

References Cited in the file of this patent

UNITED STATES PATENTS

| 1,363,162 | Myers et al. | Dec. 21, 1920 |
| 1,665,636 | Marden et al. | Apr. 10, 1928 |
| 2,700,118 | Hughes et al. | June 18, 1955 |